United States Patent
Joseph et al.

(10) Patent No.: US 11,287,085 B2
(45) Date of Patent: Mar. 29, 2022

(54) ARRANGEMENT FOR REMOVING CONDENSATE FROM A HEAT EXCHANGER

(71) Applicant: Forbes Marshall Private Limited, Maharashtra (IN)

(72) Inventors: Ronnie Joseph, Maharashtra (IN); Milind Joshi, Maharashtra (IN)

(73) Assignee: FORBES MARSHALL PRIVATE LIMITED, Maharashtra (IN)

( * ) Notice: Subject to any disclaimer, the term of this patent is extended or adjusted under 35 U.S.C. 154(b) by 434 days.

(21) Appl. No.: 16/335,427

(22) PCT Filed: Sep. 27, 2017

(86) PCT No.: PCT/IB2017/055886
§ 371 (c)(1),
(2) Date: Mar. 21, 2019

(87) PCT Pub. No.: WO2018/060871
PCT Pub. Date: Apr. 5, 2018

(65) Prior Publication Data
US 2020/0018441 A1    Jan. 16, 2020

(30) Foreign Application Priority Data

Sep. 28, 2016    (IN) .............................. 201621033189

(51) Int. Cl.
*F16T 1/24* (2006.01)
*F28F 17/00* (2006.01)
(Continued)

(52) U.S. Cl.
CPC .................. *F16T 1/24* (2013.01); *F16T 1/00* (2013.01); *F16T 1/20* (2013.01); *F28F 17/005* (2013.01)

(58) Field of Classification Search
CPC .......... F16K 24/048; F16K 31/26; F16T 1/24; F28B 9/08; F28F 17/005
(Continued)

(56) References Cited

U.S. PATENT DOCUMENTS

| | | | | |
|---|---|---|---|---|
| 5,141,405 A | * | 8/1992 | Francart, Jr. .......... | F16K 31/265 417/133 |
| 5,655,888 A | * | 8/1997 | Yumoto ................ | F04B 49/025 417/132 |
| 5,865,603 A | * | 2/1999 | Francart, Jr. ............ | F22D 11/06 417/133 |

FOREIGN PATENT DOCUMENTS

| CN | 204514103 U | * | 7/2015 |
|---|---|---|---|
| CN | 204514103 U | | 7/2015 |
| WO | 2014199396 A2 | | 12/2014 |

OTHER PUBLICATIONS

Int'l Search Report dated Dec. 12, 2017 in Int'l Application No. PCT/IB2017/055886.

* cited by examiner

*Primary Examiner* — Larry L Furdge
*Assistant Examiner* — Chang H Park
(74) *Attorney, Agent, or Firm* — Panitch Schwarze Belisario & Nadel LLP

(57) ABSTRACT

An arrangement (400) for removing condensate from a heat exchanger (208) is provided. The arrangement (400) facilitates removal of a condensate from the heat exchanger (208) even when the pressure inside the heat exchanger drops below pressure of a condensate discharge pipe (220). The arrangement (400) operates in a first configuration when the pressure in the heat exchanger (208) is higher than the pressure in the condensate discharge pipe (220), and in a (Continued)

second configuration when the pressure in the heat exchanger (208) is lower than the pressure in the condensate discharge pipe (220).

7 Claims, 18 Drawing Sheets

(51) Int. Cl.
*F16T 1/00* (2006.01)
*F16T 1/20* (2006.01)

(58) Field of Classification Search
USPC .................................. 165/231; 417/130–135
See application file for complete search history.

ARRANGEMENT FOR REMOVING CONDENSATE FROM A HEAT EXCHANGER

CROSS-REFERENCE TO RELATED APPLICATION

This application is a Section 371 of International Application No. PCT/IB2017/055886, filed Sep. 27, 2017, which was published in the English language on Apr. 5, 2018, under International Publication No. WO 2018/060871 A1, which claims priority under 35 U.S.C. § 119(b) to Indian Patent Application No. 201621033189, filed on Sep. 28, 2016, the disclosures of which are incorporated herein by reference in their entireties.

FIELD

The present disclosure relates to the field of arrangements for removing condensate from a heat exchanger.

BACKGROUND

Steam is one of the most widely used working fluid in the process industries such as textile, pharmaceutical, oil & gas, power generation and the like. Steam is also used as a heat transfer fluid in process industries.

A steam trap is used to discharge condensate. A conventional steam trap is connected to a heat exchanger via a first condensate header. The steam trap is configured to separate steam vapours from the condensate, and to supply the condensate to a feed water tank via a second condensate header. Under normal operating conditions, the pressure in the first condensate header is more than the pressure in the second condensate header. This facilitates flow of the condensate from the heat exchanger to the steam trap and from the steam trap to the feed water tank. However, in some operating conditions, the pressure in the first condensate header may reduce, and can become lower than the pressure in the second condensate header. Due to this, the removal of the condensate from the heat exchanger is interrupted, thereby causing accumulation of the condensate inside the heat exchanger which adversely affects the heat transfer in the heat exchanger.

Hence, in order to overcome the aforementioned drawbacks, there is need of an arrangement that facilitates removal of a condensate from a heat exchanger even when the pressure inside the heat exchanger drops below or becomes equal to pressure in a condensate discharge pipe.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide an arrangement that efficiently removes condensate from a heat exchanger.

Another object of the present disclosure is to provide an arrangement that facilitates the removal of the condensate from a heat exchanger even when the pressure inside the heat exchanger drops below that of the downstream pressure.

Yet another object of the present disclosure is to provide an arrangement for removing condensate from a heat exchanger that is compact.

Other objects and advantages of the present disclosure will be more apparent from the following description, which is not intended to limit the scope of the present disclosure.

SUMMARY

The present envisages an arrangement for removing condensate from a heat exchanger. The arrangement includes a vessel, a buoyant body disposed in the vessel, a four bar linkage, and an actuator link. The vessel has a condensate inlet port in fluid communication with an outlet of the heat exchanger to receive condensate, a condensate outlet port in fluid communication with the condensate discharge pipe, a steam inlet port in fluid communication with a steam source, and a steam outlet port. The four bar linkage has a fixed link, a crank connected to the fixed link and the buoyant body, a driven link connected to the fixed link, and a coupler link connected to the crank and the driven link. The actuator link is pivotally connected to a pivot and connected to a junction of the driven link and the coupler link via a biasing member. The actuator link is configured to be displaced between a first stopper and a second stopper under influence of the biasing member.

The arrangement further includes a first slider link and a condensate outlet valve. The condensate outlet port is connected to the first slider link. The first slider link is coupled to the crank and is linearly displaced under the influence of the crank. Further, the condensate outlet valve is configured to open or close the condensate outlet port.

In an embodiment, ratio of angular displacement of the crank to the angular displacement of the driven link is more than 1. The aspect ratio of the buoyant body is less than 2.

The arrangement comprises a steam inlet valve and a steam exhaust valve. The steam inlet valve is configured to be linearly displaced under influence of the actuator link. The steam inlet valve is configured to open or close the steam inlet port. The steam inlet valve rests against an operative outer surface of the steam inlet port. The steam exhaust valve is connected to the actuator link in a plane parallel to the steam inlet valve, and is configured to be linearly displaced under influence of the actuator link. The steam exhaust valve is configured to open or close the steam outlet port. The steam exhaust valve rests against an operative inner surface of the steam outlet port.

In an embodiment, ratio of angular displacement of the crank to the angular displacement of the driven link is more than 1.

BRIEF DESCRIPTION OF THE ACCOMPANYING DRAWING

An arrangement for removing condensate from a heat exchanger, of the present disclosure, will now be described with the help of the accompanying drawing, in which.

Figure 8A:
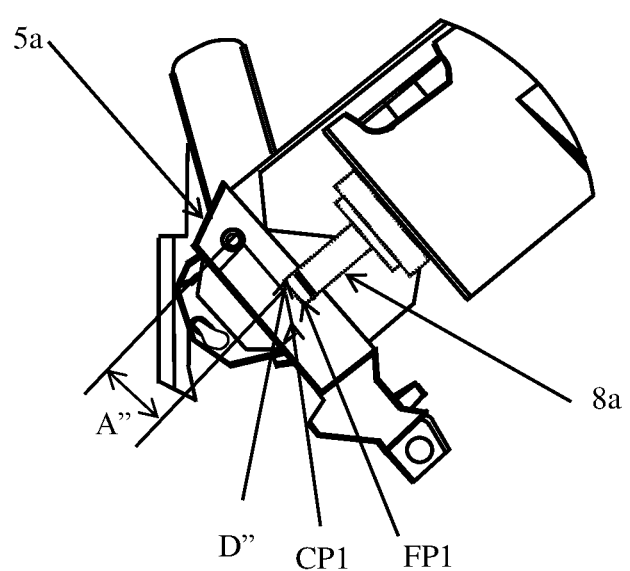
Figure 8B:
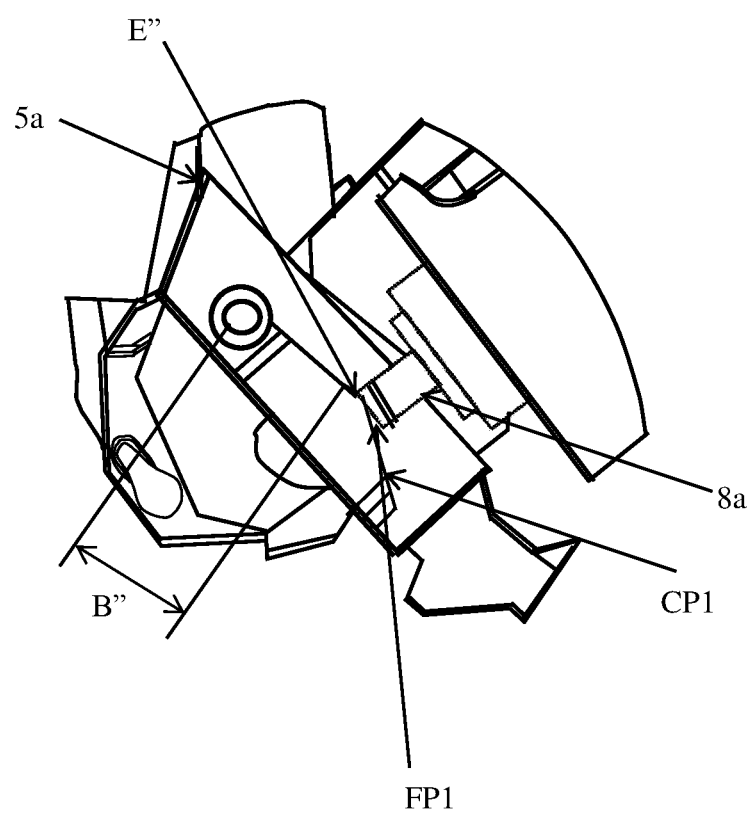
Figure 8C:
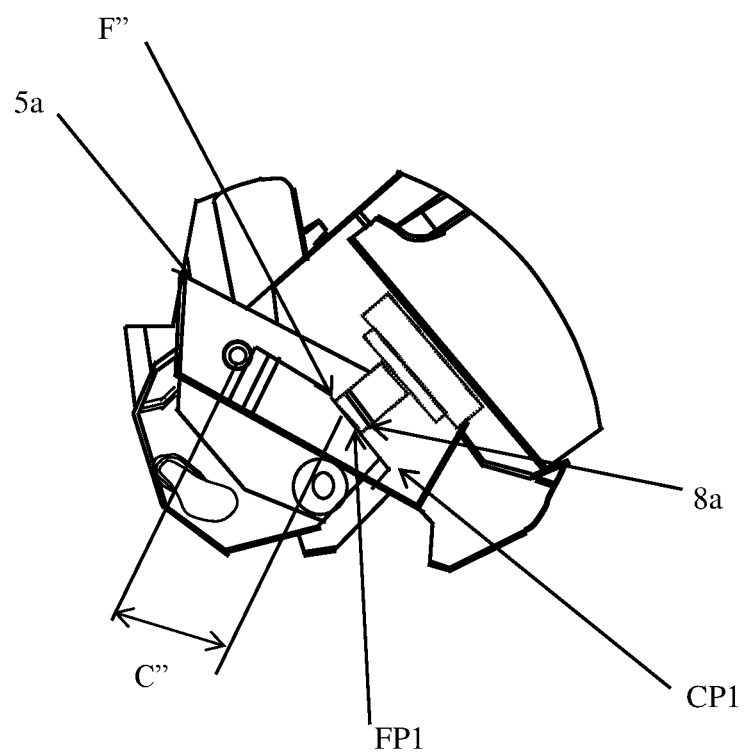
Figure 9A:
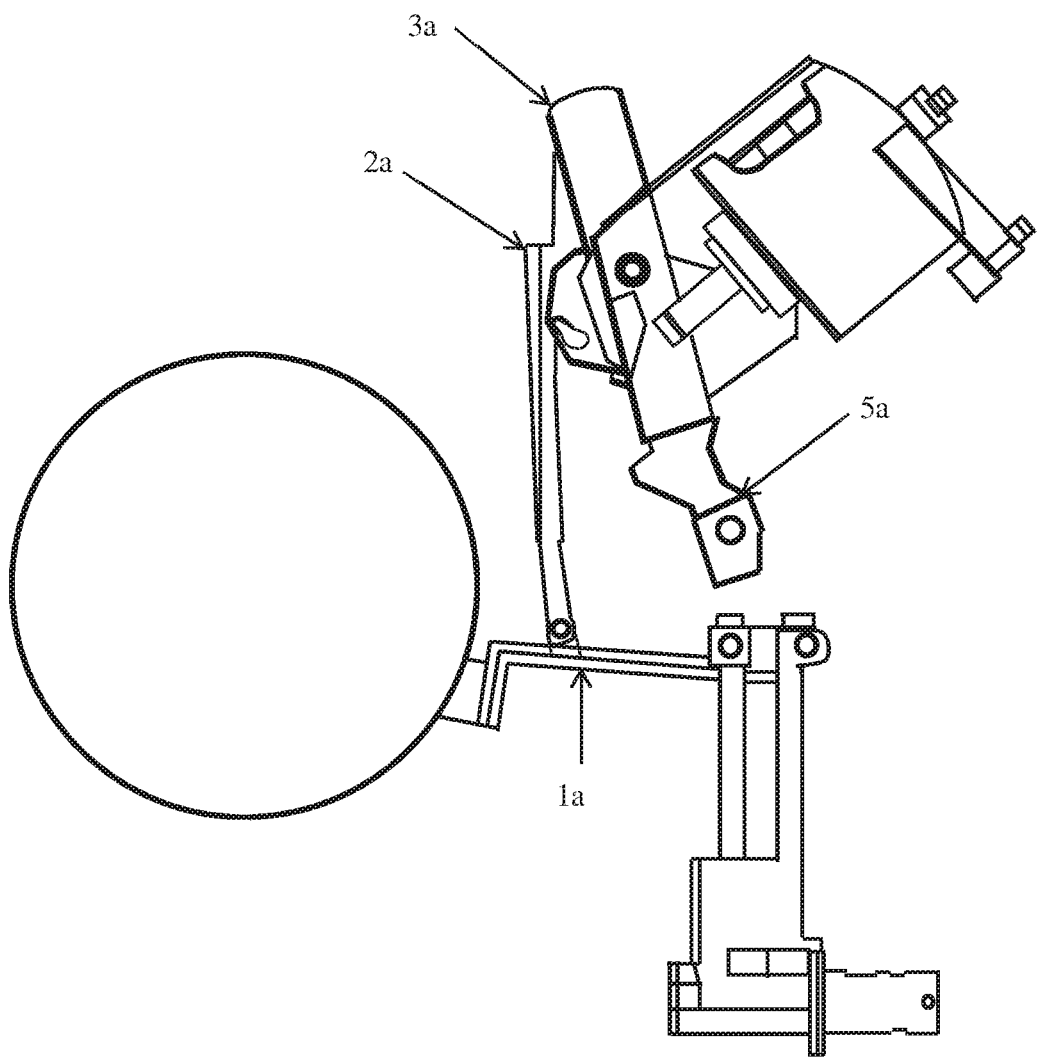
Figure 9B:
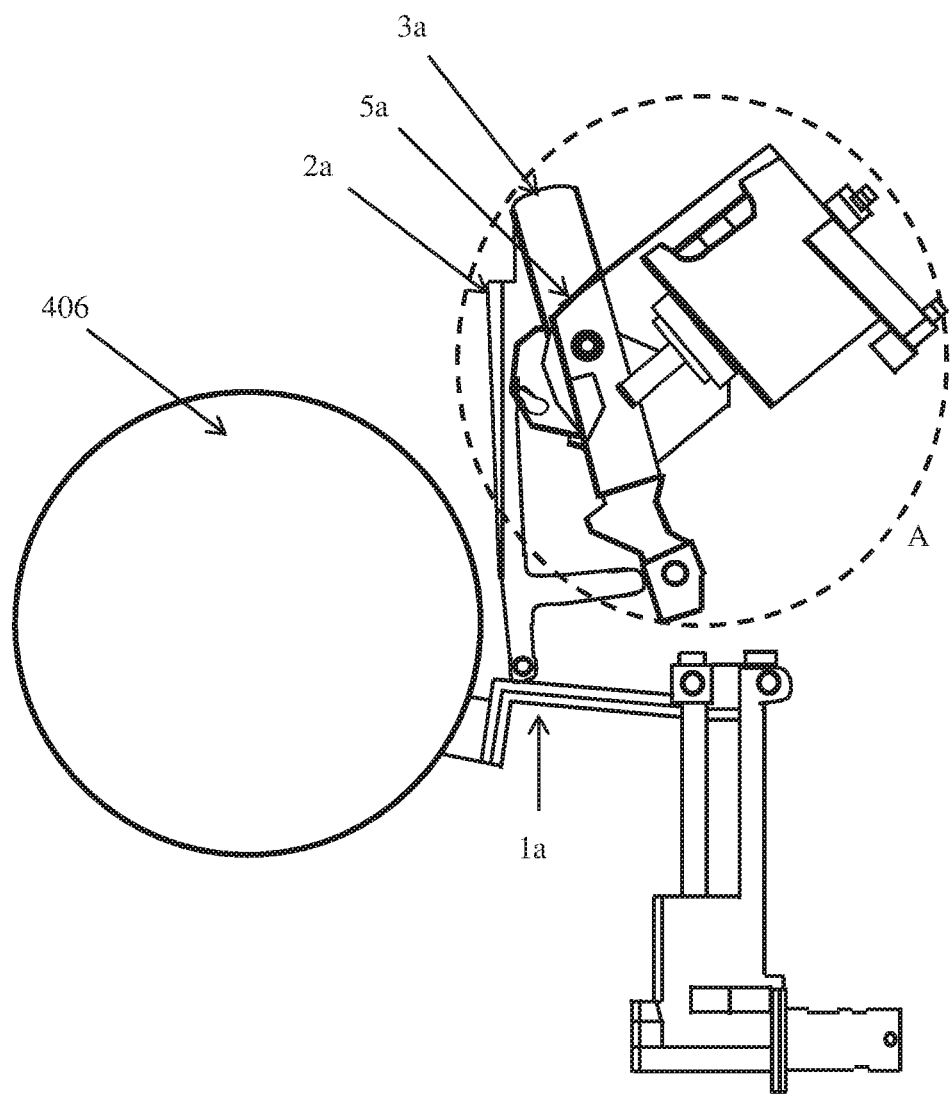
Figure 9C:
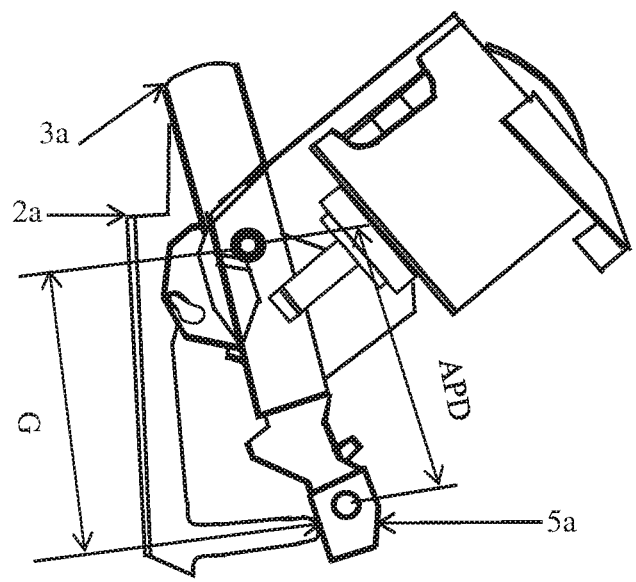
Figure 10A:
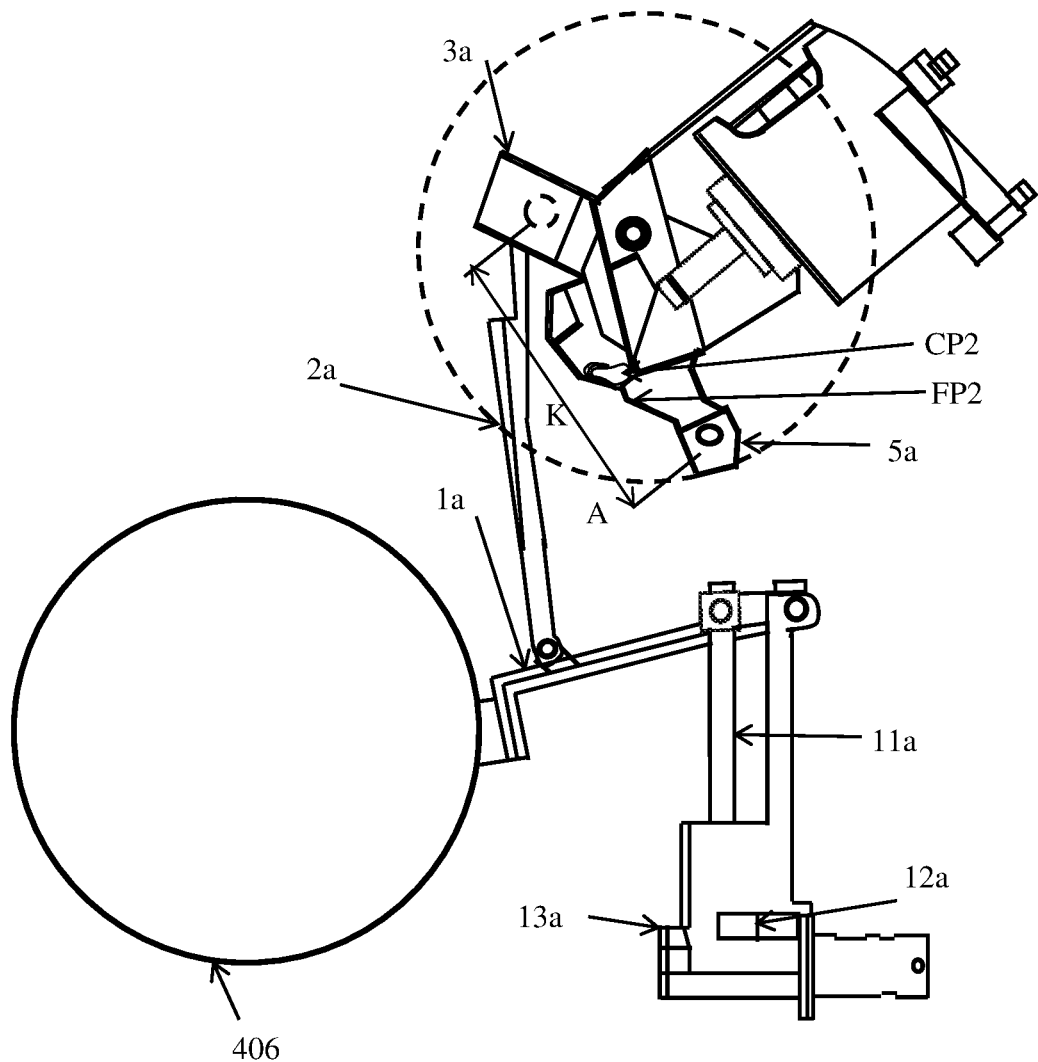
Figure 10B:
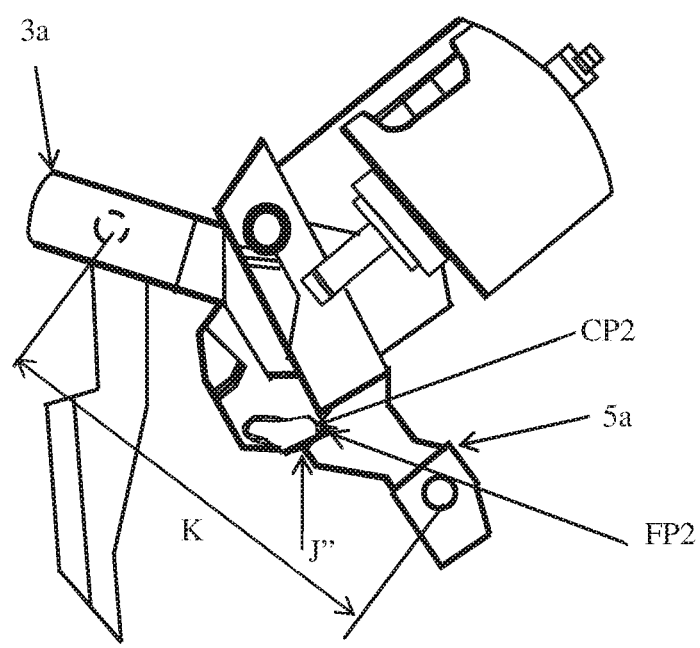

FIG. 8A, FIG. 8B, and FIG. 8C illustrate side views of a first cam and follower mechanism used in the arrangement of the present disclosure;

FIG. 9A illustrates a side view of a buoyant body and the four bar mechanism used in the arrangement of the present disclosure;

FIG. 9B and FIG. 9C illustrate side views of the buoyant body and the four bar mechanism, in accordance with another embodiment, used in the arrangement of the present disclosure; and FIG. 10A and FIG. 10B illustrate side views of the buoyant body and the four bar mechanism, in accordance with yet another embodiment, used in the arrangement of the present disclosure.

LIST OF REFERENCE NUMERALS 1, 1a—Crank
2, 2a—Coupler link
3, 3a—Driven link
4—Fixed link
5, 5a—Actuator link
6—Biasing member
7, 8a—Steam inlet valve
8, 10, 18—Seat
9—Steam exhaust valve
11, 11a—First slider link
12, 12a—Condensate outlet valve
13 a Trap seat
100—Conventional system
102—First steam header
104—Control valve
106—Second steam header
108, 208—Heat exchanger
110—First process fluid header
112—Second process fluid header
114—First condensate header
116—Conventional steam trap
118—Condensate return header
120—Second condensate header
122—Check valve
124—Bypass valve
200—System
202—First steam header
204—Control valve
206—Second steam header
210—First process fluid header
211—First condensate header
212—Condensate inlet check valve
213—Steam inlet header
216—Steam outlet pipe
218—Feed water tank
220—Condensate discharge pipe
222—Condensate outlet check valve
400—Arrangement of the present disclosure
402—Vessel
404—Condensate inlet port
406—Buoyant body
408—Mounting bracket
410—Mounting base
412—Condensate outlet port
414—Steam inlet port
416—Steam outlet port

DETAILED DESCRIPTION

Figure 1:
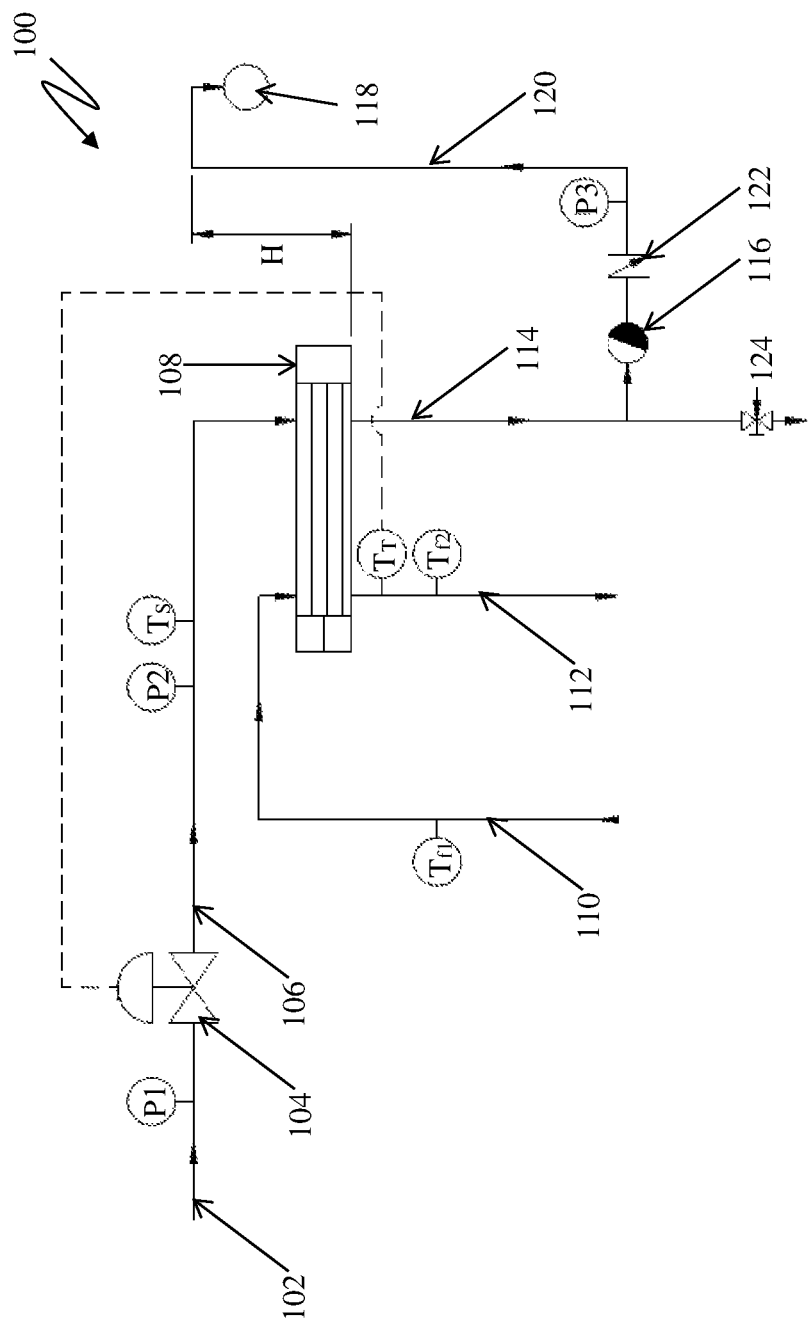
FIG. 1 illustrates a schematic view of a system in the process industry with a conventional steam trap.

FIG. 1 illustrates a schematic view of a system 100 used in the process industries, such as textile, pharmaceutical, oil & gas, and the like, with a conventional steam trap 116. The system 100 comprises a first steam header 102 that allows a passage of steam there through. The first steam header 102 terminates into a control valve 104 that regulates the supply of steam into a second steam header 106 that is connected to the control valve 104. The second steam header 106 is in fluid communication with a heat exchanger 108 and supplies the steam into the heat exchanger 108. A first process fluid header 110 supplies the process fluid (the fluid that needs to be heated) into the heat exchanger 108, wherein thermal communication between the steam and the process fluid takes place, thereby heating the process fluid and condensing the steam. The temperature of the process fluid inside the first process fluid header 110 is $T_{f1}$. The heated process fluid, at an increased temperature of $Tf_2$, is evacuated from the heat exchanger via a second process fluid header 112 which carries the process fluid. The condensate is evacuated from the heat exchanger 108 via a first condensate header 114. The first condensate header 114 is in fluid communication with a steam trap 116, which is configured to separate the steam vapours from the condensate and supply the condensate into a condensate return header 118 that is usually connected to the feed water tank via a second condensate header 120 that is in fluid communication with the steam trap 116 and the condensate return header 118. A check valve 122 is mounted on the second condensate header 120 to regulate the supply of the condensate into the condensate return header 118.

P1 is the pressure of the steam in the first steam header 102, P2 is the pressure of the steam in the second header 106, and P3 is the pressure of the condensate in the second condensate header 120. The pressure of the condensate in the first condensate header 114 is roughly equal to P2 as there is very little pressure drop in the heat exchanger 108 during operation. The pressure P3 in the steam trap acts as a back pressure against the pressure P2 inside the steam trap 116.

The outlet of the steam trap 116 is connected to the second condensate header 120 through the check valve 122 maintained at a pressure usually above gauge pressure and at an elevation H such that the effective pressure acting at the outlet of the steam trap 116, which is referred to as the back pressure, is P3.

Typically, the state of the steam entering the heat exchanger 108 is dry saturated corresponding to the steam pressure P2 so that any heat transfer taking place from the steam to the process fluid is the latent heat of condensation of the steam at the pressure P2. The temperature of the steam, $T_s$ is a function of the steam pressure in the saturated region and once the pressure is kept constant, the temperature also remains constant. Hence, by controlling the pressure P2, the temperature of the steam $T_s$ is controlled. The control valve 104 controls the pressure P2 in accordance with the feedback from a temperature sensor TT mounted on the second process fluid header 112. It thereby controls the steam temperature $T_s$, and hence, the heat transfer rate from the steam to the process fluid. The steam trap only allows condensate (steam that has condensed after transferring its latent heat of condensation) to flow out thereby ensuring that the entire latent heat of condensation has been transferred from the steam to the process fluid. Flow rate of condensate out of the steam trap 116 is a function of the differential pressure which is the difference between the pressure P2 and the back pressure P3. The flow rate of condensate out of the steam trap 116 increases with the increase in differential pressure and reduces to zero when the differential pressure is zero. This is due to the fact that when the pressure P2 is greater than the back pressure P3, the steam pressure itself pushes the condensate out of the steam trap 116. This condensate is usually recovered through the second condensate header 120 which is connected to a condensate recovery system that returns the condensate back to the feed water tank of the boiler.

Assuming steady state conditions, the heat transfer rate required from the steam to the process fluid flowing, steadily at a mass flow rate ($m_p$) is, $$Q=m_p*C*(T_{f2}-T_{f1})$$

Where,
C=avg. specific heat of the process fluid between $T_{f2}$ and $T_{f1}$ (KJ/kg-K)
$m_p$=mass flow rate of the process fluid (kg/s)
Q=heat transfer rate required (KJ/s or KW)
For a heat exchanger of known heat transfer coefficient U (W/m²-K)

$$A=Q/(U*LMTD)$$

Where,
A=required area of heat transfer of the heat exchanger (m²)
LMTD=Logarithmic mean temperature difference in the heat exchanger $$LMTD=(T_{f2}-T_{f1})/[In\{(T_s-T_{f1})/(T_s-T_{f2})\}]$$

Having found out the steam temperature ($T_s$), the corresponding saturation pressure P2 can be determined, and the mass flow rate of steam required can be calculated as, $$m_s=Q/h_{fg} \text{ at } P2$$

Where,
$h_{fg}$ at P2=latent heat of condensation of steam at process pressure P2 (KJ/kg)
$m_s$=mass flow rate of steam required (Kg/s)

Using the above relations, the required steam temperature $T_s$ can be evaluated, and correspondingly the required pressure P2 and the steam flow rate can be determined.

Thus, for a steady state condition, the heat exchanger is selected on the basis of the following two primary requirements:
the maximum heat transfer rate Q; and
the steam temperature $T_s$ and the corresponding pressure P2 such that P2>P3, thereby ensuring that the differential pressure across the steam trap 116 is positive.

Hence, by appropriately sizing the steam trap 116 for the lowest possible differential pressure, the condensate can be effectively removed from the heat exchanger 108.

In many process applications, the mass flow rate of the process fluid ($m_r$) may not be steady but varies with time even though the process fluid outlet temperature $T_{f2}$ may be required to be kept constant or alternatively for a constant mass flow rate of the process fluid, the required process fluid outlet temperature $T_{f2}$ may vary with time. There are instances where both the mass flow rate of the process fluid as well as the temperature $T_{f2}$ may vary with time. However, in both cases, the heat exchanger will still have to be designed for the maximum heat transfer rate Q.

As the required heat transfer rate reduces for a given heat exchanger and back pressure P3, the required steam temperature $T_s$ reduces as per the function obtained as follows:

$$Q=U*A*LMTD$$

$$m_p*C*(T_{f2}-T_{f1})=[U*A*(T_{f2}-T_{f1})]/[In\{(T_s-T_{f1})/(T_s-T_{f2})\}]$$

$$In\{(T_s-T_{f1})/(T_s-T_{f2})\}=(U*A)/(m_p*C)$$

$$\{(T_s-T_{f1})/(T_s-T_{f2})\}=e^{[(U*A)/(m_p*C)]}$$

$$T_s=\{T_{f1}-T_{f2}*e^{[(U*A)/(m_p*C)]}\}/\{1-e^{[(U*A)/(m_p*C)]}\}$$

Where, e is the exponential function.

From the above relation, in the first case, when $T_{f2}$ has to be maintained constant and $m_p$ is a variable and reduces, the corresponding pressure P2 also reduces. In the second case when $m_p$ is constant and $T_{f2}$ reduces, the required pressure P2 again reduces. In other words, as the required heat transfer rate reduces the required steam temperature $T_s$, and correspondingly the pressure P2 also is also reduced.

Thus, the system 100 is under normal operation when the heat exchanger 108 operates at heat transfer rates close to the heat exchanger maximum design conditions, the steam temperature $T_s$ is the highest and the corresponding pressure P2 is also the highest, thereby giving the maximum differential pressure (DP) across the steam trap 116. Such a condition will hereby be termed as pure steam trapping, and for an appropriately sized steam trap 116, the condensate flow rate out of the steam trap 116 will be maximum. The pressure P2, in this case, will be adequate to push the condensate out of the steam trap 116 against the back pressure P3 at a rate greater than the rate of condensation of steam in the heat exchanger 108.

When the required heat transfer rate reduces, i.e., when required $T_{f2}$ is reduced, the corresponding pressure P2 will reduce and at a certain required heat transfer rate, the pressure P2 will be just enough to push the condensate out of the steam trap 116 against the back pressure P3 at a rate equal to the rate of condensation of steam in the heat exchanger 108. Any further reduction in the required heat transfer rate will cause the process pressure P2 to drop, and the rate of condensate removal will become less than the rate of condensation within the heat exchanger 108. This will lead to the backing up of condensate in the heat exchanger 108. This condition is the beginning of a stall which will be referred to as stalling, where the required differential pressure across the steam trap 116 becomes marginally greater than the actual differential pressure. In the case, where the required heat transfer rate reduces to the point that the differential pressure across the steam trap 116 becomes equal to or less than zero, there will be no condensate removal from the steam trap 116 and such a condition will hereby be termed as pure stalling.

From the beginning of stalling to pure stalling, the condensate that backs up into the heat exchanger 108 reduces the effective area of heat transfer, thereby leading to a drop in the process fluid outlet temperature $T_{f2}$. In order to avoid this situation, the condensate is drained via a bypass valve 124 into an open drain as shown in FIG. 1. This leads to a loss of condensate which has to be made up as fresh make up water in the feed water tank, and also increases the fuel consumption due to the additional sensible heat that needs to be transferred to the makeup water in the boiler. The condensate, in the pure trapping condition, would have been returned at the steam temperature $T_s$ or the maximum temperature of operation of the condensate recovery system which is typically around 90° C. (provided pressure powered pumps are used). The fresh make up water also needs to be treated which adds to the cost.

For certain conditions, the required heat transfer rate will reduce to such an extent that the pressure P2 may fall below atmospheric pressure. Draining condensate into an open drain will only be due to the head of condensate above the bypass valve. Also, due to the lower process pressure than atmospheric pressure, there are chances of air ingress into the heat exchanger through the bypass valve which may lead to corrosion of the heat exchanger and the condensate recovery pipe line over a period of time.

In order to overcome the aforementioned drawbacks, the present disclosure envisages an arrangement for removing condensate from a heat exchanger (hereinafter also referred to as arrangement) to be used in the process industries. The arrangement, of the present disclosure, facilitates the removal of the condensate from the heat exchanger even when the pressure inside the heat exchanger falls below that of the downstream pressure.

The arrangement, of the present disclosure, is now described with reference to FIG. 2 through FIG. 10B.

Figure 2:
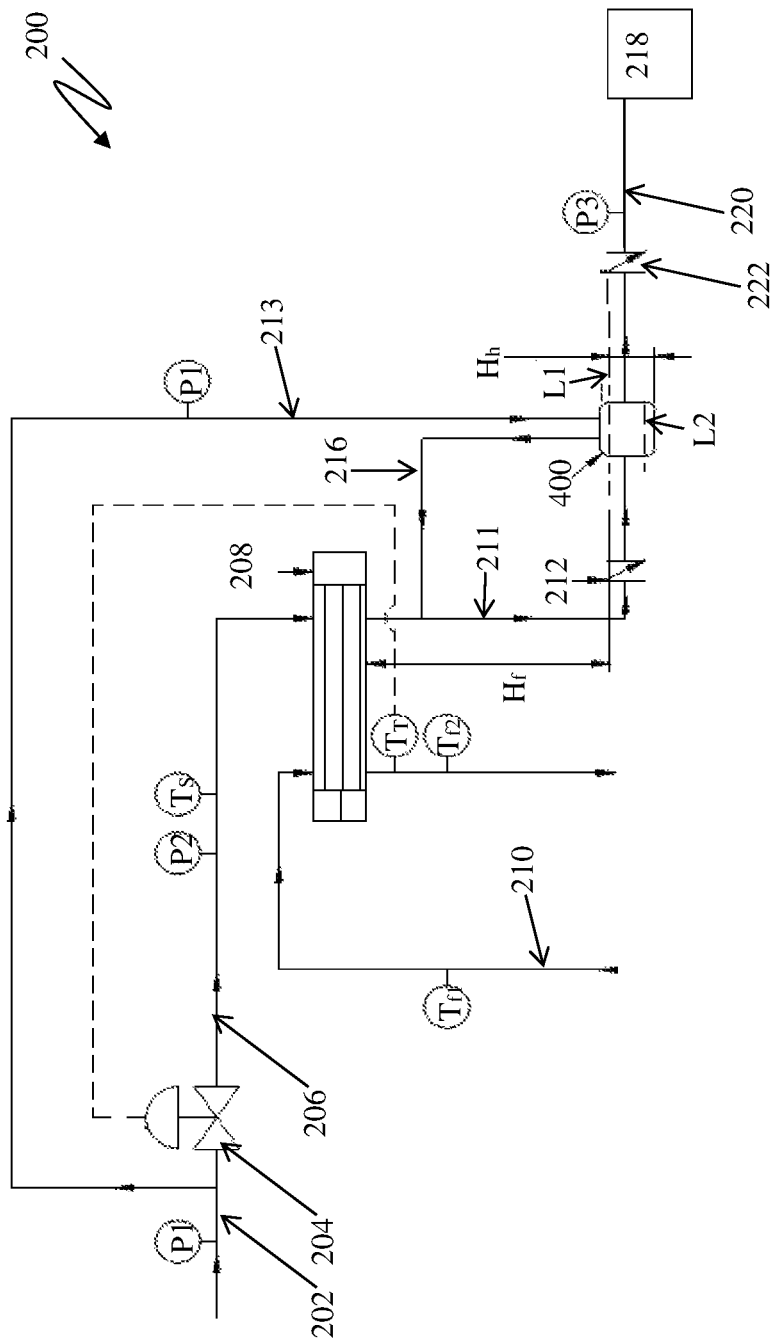
FIG. 2 illustrates a schematic view of a system in the process industry with an arrangement of the present disclosure.

FIG. 2 illustrates a schematic view of a system 200 in the process industry with an arrangement 400, of the present disclosure. The system 200 comprises a first steam header 202 that allows the passage of steam therethrough. The pressure of the steam inside the first steam header 202 is P1. The first steam header 202 terminates into a control valve 204. A second steam header 206 facilitates the fluid communication between the control valve 204 and a heat exchanger 208. More specifically, the control valve 204 regulates the supply of the steam from the first steam header 202 into the heat exchanger 208 via the second steam header 206. The steam entering the heat exchanger 208 is a pressure P2 and temperature $T_s$. The system 200 further comprises a first process fluid header 210 that allows the passage of the process fluid into the heat exchanger 208. The temperature of the process fluid entering the heat exchanger 208 is $T_{f1}$.

After the process fluid enters the heat exchanger 208, thermal communication between the process fluid and the steam causes an increase in the temperature of the process fluid to $T_{f2}$ and also causes the steam to condense. The condensate is removed from the heat exchanger 208 via a first condensate header 211. The first condensate header 211 supplies the condensate to the arrangement 400, of the present disclosure, via an inlet check valve 212. The system 200 further includes a steam inlet header 213 that facilitates the fluid communication between the first steam header 202 and the arrangement 400. The arrangement 400 is also in fluid communication with the first condensate header 211 via a steam outlet pipe 216. The condensate collected in the arrangement 400 is supplied to a feed water tank 218 via a condensate discharge pipe 220. The pressure of the condensate inside the condensate discharge pipe 220 is P3. An outlet check valve 222 regulates the flow of the condensate from the arrangement 400 into the feed water tank 218.

The arrangement 400 operates in two operative configurations, i.e., a first configuration and a second configuration. The arrangement 400 operates in the first configuration when pressure P2 in the heat exchanger is greater than the pressure P3 in the condensate discharge pipe 220. The arrangement 400 operates in the second configuration when the pressure P2 in the heat exchanger is lower than or equal to the pressure P3 in the condensate discharge pipe 220.

The arrangement 400 includes a vessel 402, a buoyant body 406, a four bar linkage, and an actuator link 5. A condensate inlet port 404, a condensate outlet port 412, a motive steam inlet port 414, and a steam outlet port 416 are configured on the vessel 402. The condensate inlet port 404 is in fluid communication with the steam/condensate outlet of the heat exchanger 208 to receive condensate. More specifically, the steam/condensate outlet of the heat exchanger 208 is connected to the inlet check valve 212 at a height $H_f$ (also known as the filling head, wherein $H_f$ is the distance between the bottom of the heat exchanger 208 and the upper level L2) whose outlet is connected to the condensate inlet port 404. The inlet check valve 212 allows flow of condensate only in one direction, i.e. towards the condensate inlet port 404 of the vessel 402. The condensate outlet port 412 is in fluid communication with the condensate discharge pipe 220 via the outlet check valve 222. The condensate discharge pipe 220 is further connected to the feed water tank usually maintained at a pressure above atmospheric pressure. The condensate inlet port 404 and the condensate outlet port 412 are configured to facilitate inflow and outflow of the condensate respectively. The effective back pressure P3 is the sum of this pressure head and the feed water tank 218/condensate header pressure. The motive steam inlet port 414 of the vessel 402 is in fluid communication with a steam source via the first steam header 202 that is maintained at pressure P1. The steam outlet port 416 of the vessel 402 is in fluid communication with the heat exchanger 208. In an embodiment, the steam outlet port 416 is connected back to the first condensate header 211. In another embodiment, the steam source is a boiler.

Figure 3A:
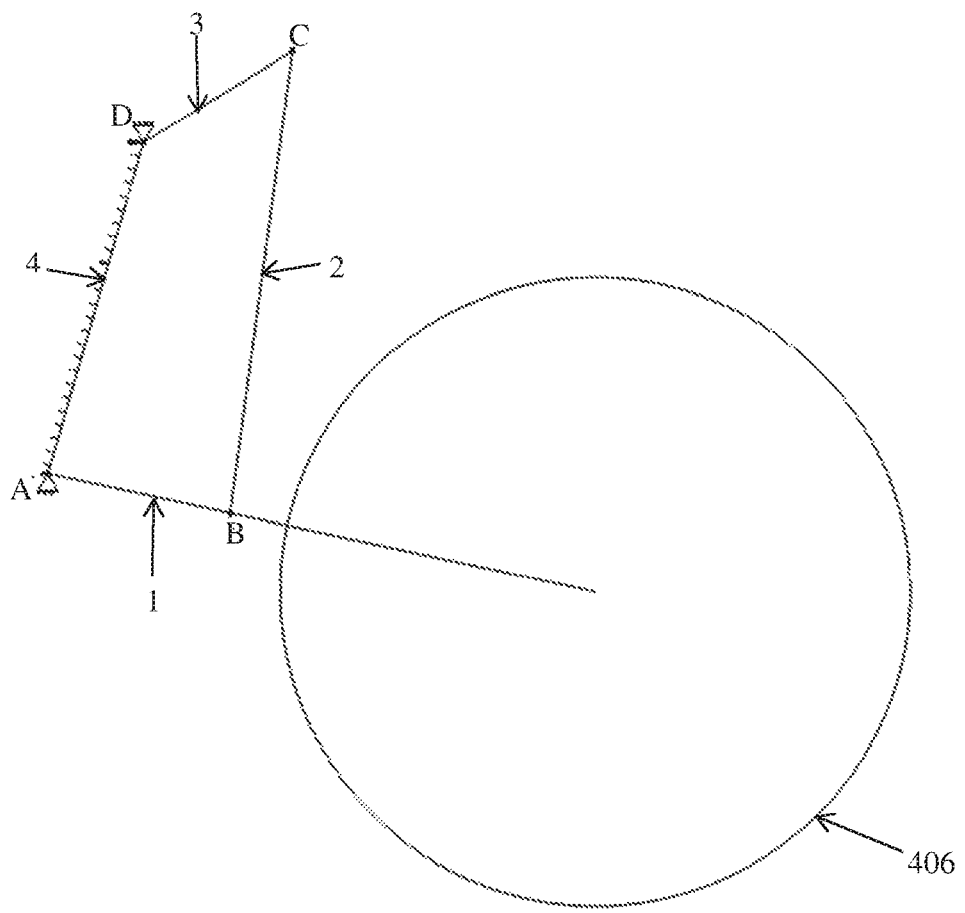
FIG. 3A illustrates a schematic view of a four bar linkage of the arrangement, in accordance with an embodiment of the present disclosure.

The construction of the arrangement 400 is now described with reference to FIG. 3A through FIG. 10B. Referring to FIG. 3A, the buoyant body 406 is disposed within the vessel 402. The buoyant body 406 is floatable on the condensate.

The four bar linkage (as shown in FIG. 3A) is disposed in the vessel 402. Each link of the four bar linkage mechanism is numbered from 1 to 4 and pin jointed as shown. The four bar linkage includes a crank 1, a coupler 2, a driven link 3, and a fixed link. The crank 1 is hingeably connected to the buoyant body 406 and the fixed link 4. The coupler link 2 is connected between the crank 1 and the driven link 3. The link 4 is the fixed link. The driven link 3 is connected to the fixed link 4 and the coupler link 2. The pin joint between the crank 1 and the fixed link 4 is A. Similarly, the pin joint between the coupler link 2 and the crank 1 is B. The pin joint between the coupler link 2 and the driven link 3 is joint C. The joint D is the pin joint between the driven link 3 and the fixed link 4. The joints A and D are fixed because of the fixed link 4.

Figure 4A:
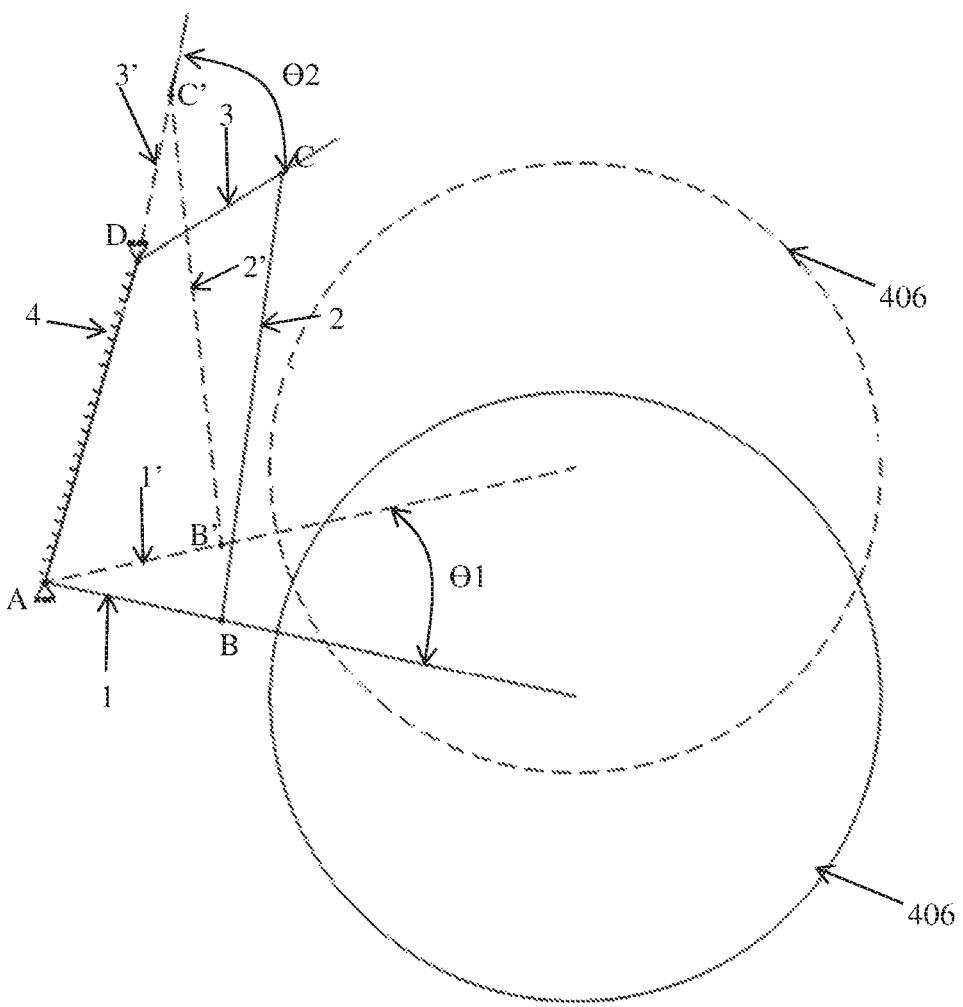
FIG. 4A illustrates another schematic view of the four bar linkage of the arrangement of the present disclosure.

The crank 1 rotates about the fixed joint A because of the buoyant force that acts on the buoyant body 406 when the condensate starts filling inside the vessel 402. The two positions of the buoyant body 406 and the four bar linkage are shown in FIG. 4A. The second position of all the links are indicated as dotted lines and subscripts for the linkages and joints are 1', 2', 3' and B', C' respectively. The fixed link 4 and the joints A, D remain in the same position. The lower position of the four bar linkage mechanism corresponds to a lower level L1 of the condensate within the vessel 402, and the upper position corresponds to an upper level L2 of the condensate within the vessel 402.

The four bar linkage mechanism is sized in such a manner that the angular displacement represented by angle $\Theta 1$ which is swept by the crank 1 as it moves from the lower position to the upper position is amplified by a factor greater than 1 into the angular displacement of the driven link 3 represented by the angle $\Theta 2$ swept by the driven link 3. In other words, (Angle $\Theta 2$/Angle $\Theta 1$)>1

More specifically, ratio of angular displacement of the crank 1 to the angular displacement of the driven link 2 is more than 1.

In an embodiment, the ratio of angular displacement of the crank 1 to the angular displacement of the driven link 2 is more than 1.5.

The amplification of the angular displacement of the crank 1 makes it possible to reduce the volume swept by the buoyant body 406 for a defined angle $\Theta 2$. This, in turn, reduces the size of the arrangement 400 for a given capacity, thereby making the arrangement 400 compact.

The arrangement 400 further comprises a first slider link 11, and a condensate outlet valve 12. The first slider link is coupled to the crank 1. The condensate outlet valve 12 is connected to the first slider link 11 which is configured to operate the condensate outlet port 412. The first slider link 11 is configured to be linearly displaced under the influence of the crank 1. More specifically, the first slider link 11 is constrained to move linearly by the sliding joint J. The condensate outlet valve 12 is configured to restrict the condensate outflow through the condensate outlet port 412 when the condensate level falls below the lower level L1 within the vessel 402. The condensate outlet valve 12 rests against a trap seat 18 on the condensate outlet port 412.

The arrangement 400 further includes a snap over center pumping mechanism.

Figures 3B, 3C:
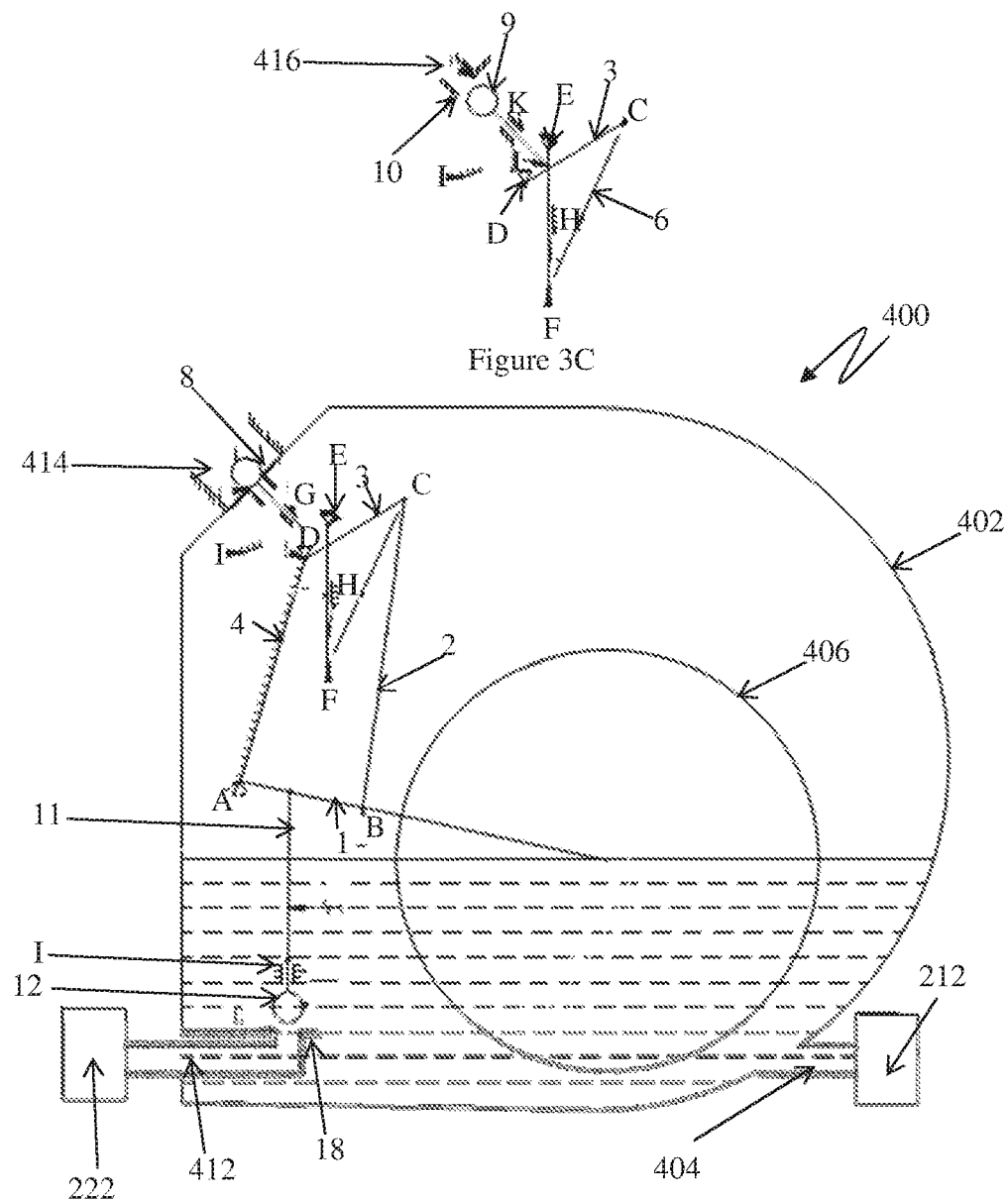
FIG. 3B illustrates a schematic view of the arrangement including a snap over center and trapping mechanism (lower level position) with a motive steam inlet port closed, in accordance with an embodiment of the present disclosure.
FIG. 3C illustrates a schematic view of a snap over center mechanism showing steam exhaust valve and seat (lower level position) with a steam outlet port open, in accordance with an embodiment of the present disclosure.

Reference is now given to FIG. 3B which shows the four bar linkage mechanism of the arrangement 400 along with the snap over center pumping mechanism.

The driven link 3 is operatively connected to the snap over center mechanism through a pin joint C. The snap over center mechanism includes a biasing member 6, the actuator link 5, and a pivot joint E. The actuator link 5 is connected to a junction of the driven link 3 and the coupler link 2 via the biasing member 6. In an embodiment, the biasing member 6 is a spring. On end of the biasing member 6 is connected to the junction, while the other end of the biasing member 6 is connected to the actuator link 5 through the pin joint F. The actuator link 5 is pivotally connected to a pivot E which is a fixed pin joint. The actuator link 5 is configured to be displaced between a first stopper H and a second stopper I under the influence of the biasing member 6 such that the actuator link 5 makes a particular angle with the vertical at these positive stoppers.

The arrangement 400 further comprises a steam inlet valve 7 and a steam exhaust valve 9. The steam inlet valve 7 is configured to be linearly displaced under the influence of the actuator link 5. The steam inlet valve 7 is configured to open or close the steam inlet port 414. The steam inlet valve 7 rests against a seat 8 on an operative outer surface of the steam inlet port 414. The steam pressure acting over the steam inlet valve 7 itself keeps it closed against the seat 8. The steam inlet valve 7 is constrained to move linearly by the sliding joint G.

The steam exhaust valve 9 (as shown in FIG. 3C) is connected to the actuator link 5 in a plane parallel to that of the steam inlet valve 7, and is configured to be linearly displaced under the influence of the actuator link 5. The steam exhaust valve 9 is configured to open or close the steam outlet port 416. Further, the steam exhaust valve 9 rests against a seat 10 on an operative inner surface of the steam outlet port 416. The steam exhaust valve 9 is constrained to slide on to the steam exhaust valve seat 10 by the sliding joint K. It is also constrained to be pushed by the actuator link 5 as it moves from one position to the other.

Figures 4B, 4C:
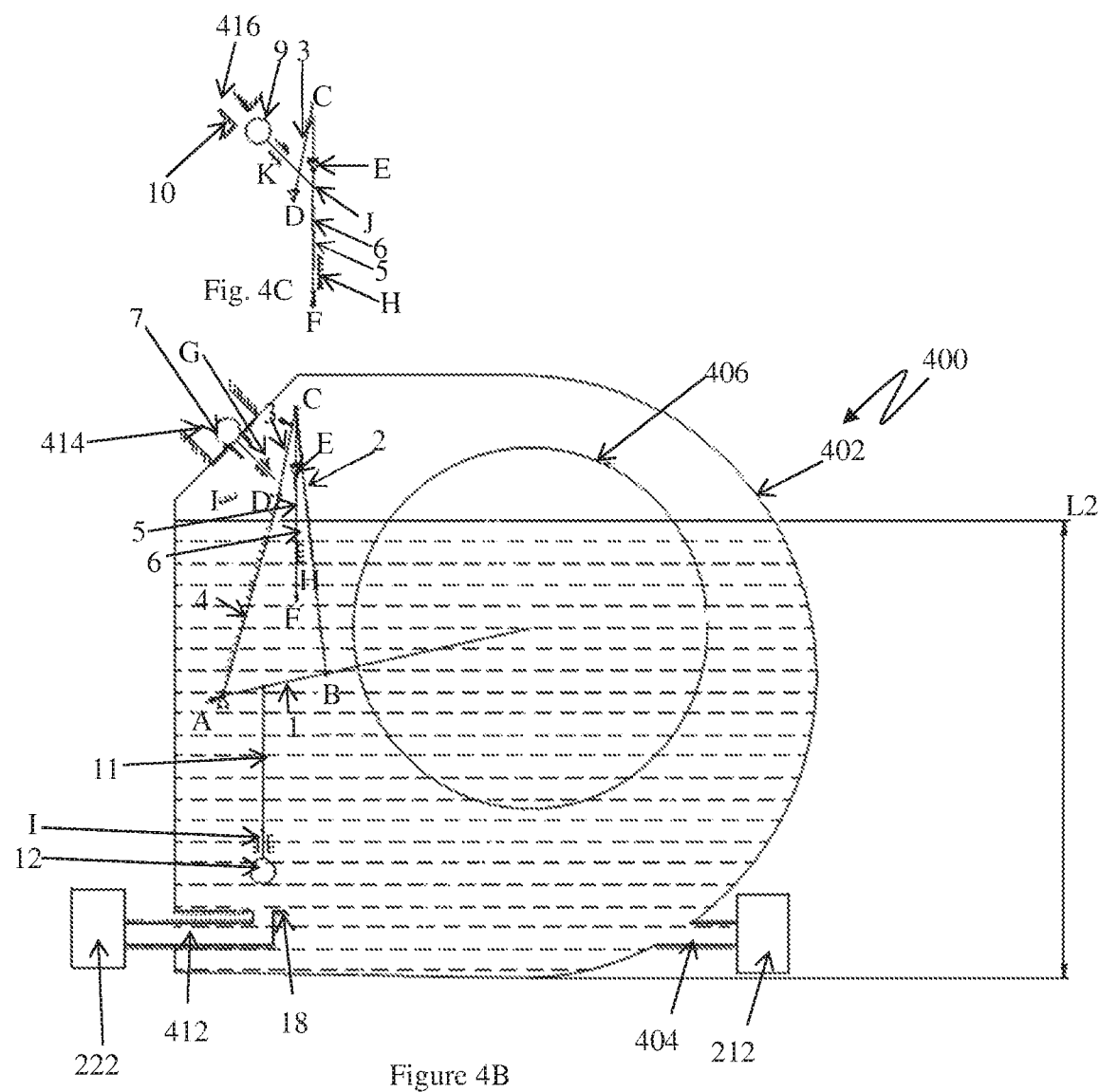
FIG. 4B illustrates a schematic view of the four bar linkage with the snap over center and trapping mechanism (upper level position) at upper snap point with motive steam inlet port closed, in accordance with an embodiment of the present disclosure.
FIG. 4C illustrates a schematic view of the snap over center mechanism showing steam exhaust valve and seat (upper level position) with steam outlet port open, in accordance with an embodiment of the present disclosure.

During the beginning of condensate filling, the buoyant body 406 rises as the level of condensate in the vessel 402 rises. The condensate flows through the condensate inlet check valve 212 into the vessel 402. The four bar linkage mechanism is proportioned such that the condensate outlet valve 12 is open against the trap seat 18 corresponding to the condensate outlet port 412 and the lower level L1. The crank 1 correspondingly rotates in the upward direction amplifying its displacement through the coupler link 2 into the angular displacement of the driven link 3. The driven link 3 in turn stretches the biasing member 6 as it biases the actuator link 5 against the stopper H. As the buoyant body 406 continues to rise, the biasing member 6 is continuously stretched. As shown in FIG. 4B, when the buoyant body 406 reaches the upper level L2, the displacement of the biasing member 6 reaches its maximum value. Any increase in the level of the condensate within the vessel 402 beyond this point causes the actuator link 5 to tip over and rotate to its second stopper I. FIG. 4B illustrates a schematic view of the four bar mechanism including the snap over center and trapping mechanism (upper level position) at upper snap point with motive steam inlet port 414 closed and the steam outlet port 416 open.

Figure 5B:
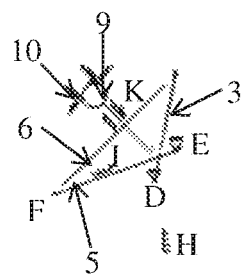
FIG. 5B illustrates a schematic view of the snap over center mechanism showing the steam exhaust valve and seat (upper level position) with steam outlet port closed, in accordance with an embodiment of the present disclosure.
Figure 5A:
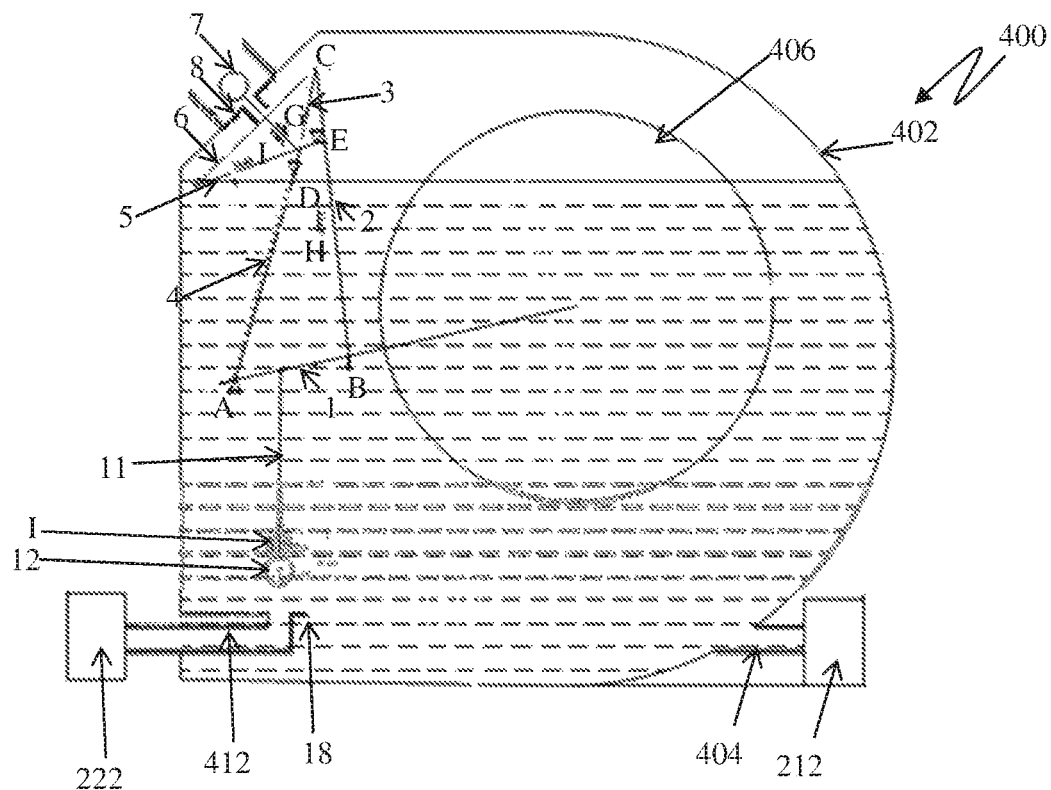
FIG. 5A illustrates a schematic view of the four bar mechanism including the snap over center and trapping mechanism (upper level position) with motive steam inlet port open, in accordance with an embodiment of the present disclosure.
Figure 6B:
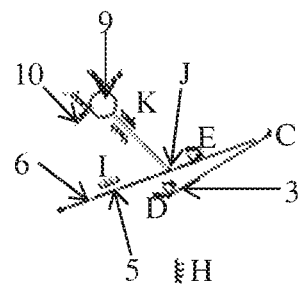
FIG. 6B illustrates a schematic view of the snap over center mechanism showing steam exhaust valve and seat (lower level position) with steam outlet port closed, in accordance with an embodiment of the present disclosure.
Figure 6A:
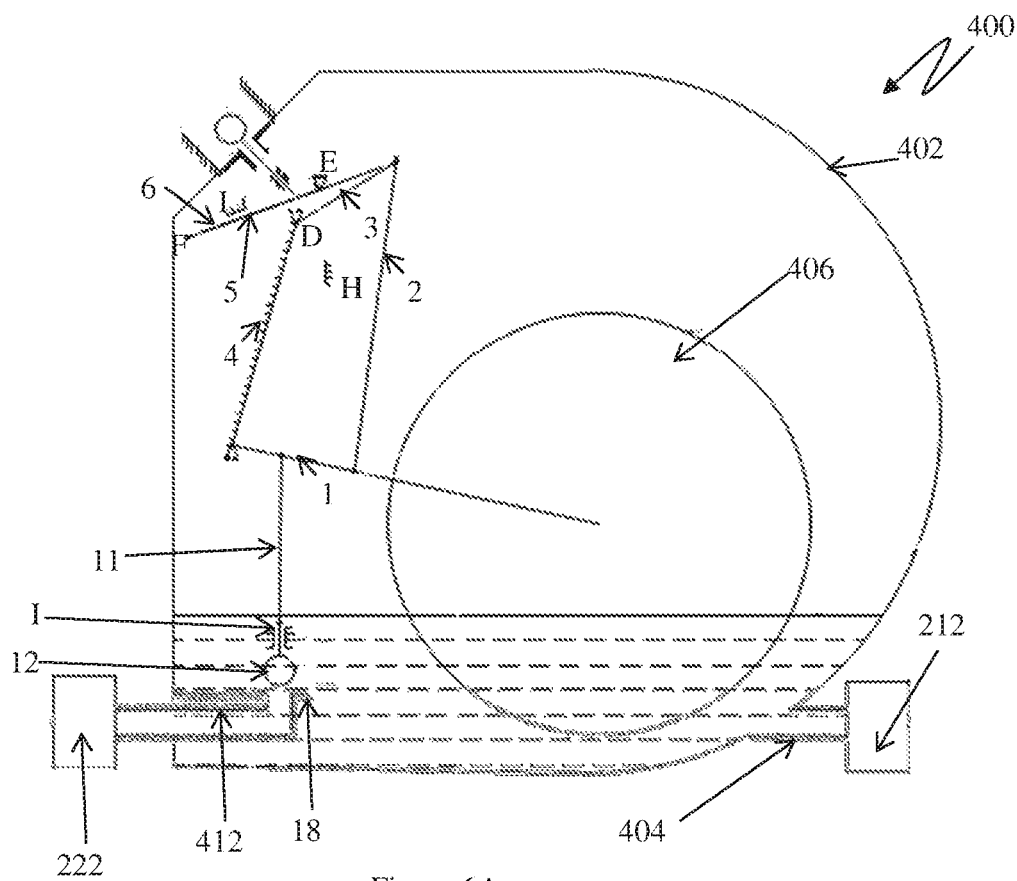
FIG. 6A illustrates a schematic view of the four bar mechanism including snap over center and trapping mechanism (lower level position) with motive steam inlet port open, in accordance with an embodiment of the present disclosure.

Referring to the FIG. 5A, the actuator link 5 rotates about its pivot E and reaches the stopper I. As the actuator link 5 rotates from its lower stopper H to the upper stopper I, it simultaneously opens the motive steam inlet valve 7 against the steam motive pressure P1 and closes the steam exhaust valve 9 against the seat 10. As the actuator link 5 rests on its upper stopper I, the displacement of the biasing member 6 reduces to its lowest value. Steam flows into the vessel 402 and steam pressurization begins. When the pressure in the vessel 402 becomes marginally greater than the back pressure P3, the steam pressurization ends and condensate pumping begins. The condensate outlet check valve 222 opens against the back pressure P3. The condensate flows out of the outlet condensate check valve 222 through the condensate outlet port 412. As the condensate level within the vessel 402 decreases, the buoyant body 406 begins to move downward by virtue of its weight, and correspondingly the crank 1 rotates to move the driven link 3 in the downward direction such that biasing member 6 again stretches but is biased against the upper stopper I. This continues up to the point where the biasing member 6 again reaches its maximum displacement, as shown in FIG. 6*a*, where the corresponding condensate level is the lower condensate level L1. Any reduction of condensate level below this point will cause the actuator link 5 to rotate over to its lower stopper H. This signals the end of condensate pumping.

As shown in FIG. 6A, as the actuator link 5 rotates, it simultaneously opens the steam exhaust valve 9 against its seat 10 and lowers the motive steam inlet valve 7, allowing it to seat on the seat 8 thereby closing the steam inlet port 414. This allows the steam from the vessel 402 to escape through the exhaust valve seat 10, thus beginning the steam exhaust. When the pressure in the vessel 402 becomes equal to the pressure P2, the steam exhaust is completed and the condensate filling begins again, and the whole cycle continues in this manner.

The snap over center mechanism is proportioned in such a way that the buoyant force required to overcome the buoyant body weight and the biasing member load increases as the buoyant body 406 rises and sweeps the angle Θ1. Further, the buoyant force required, as the buoyant body 406 moves in the downward direction, first decreases reaches its lowest value and then increases to a particular value.

Figure 7A:
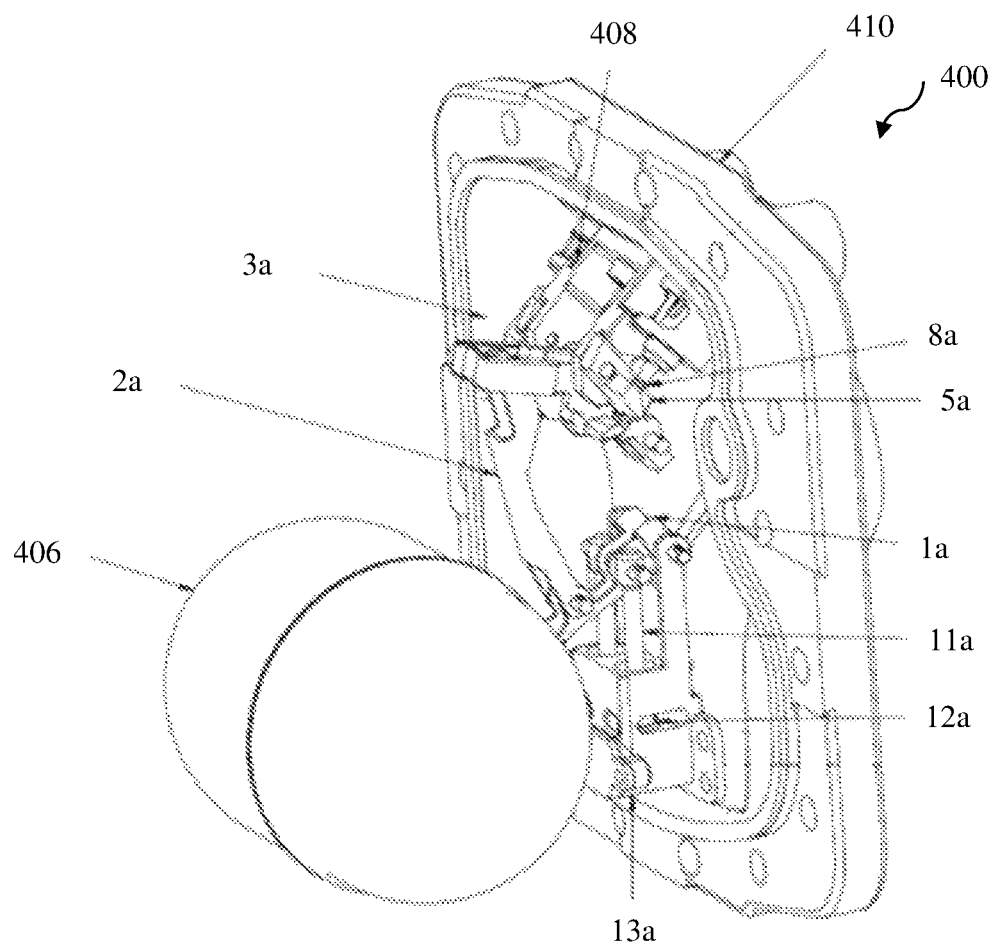
FIG. 7A and FIG. 7B illustrate isometric views of the arrangement, in accordance with an embodiment of the present disclosure.
Figure 7B:
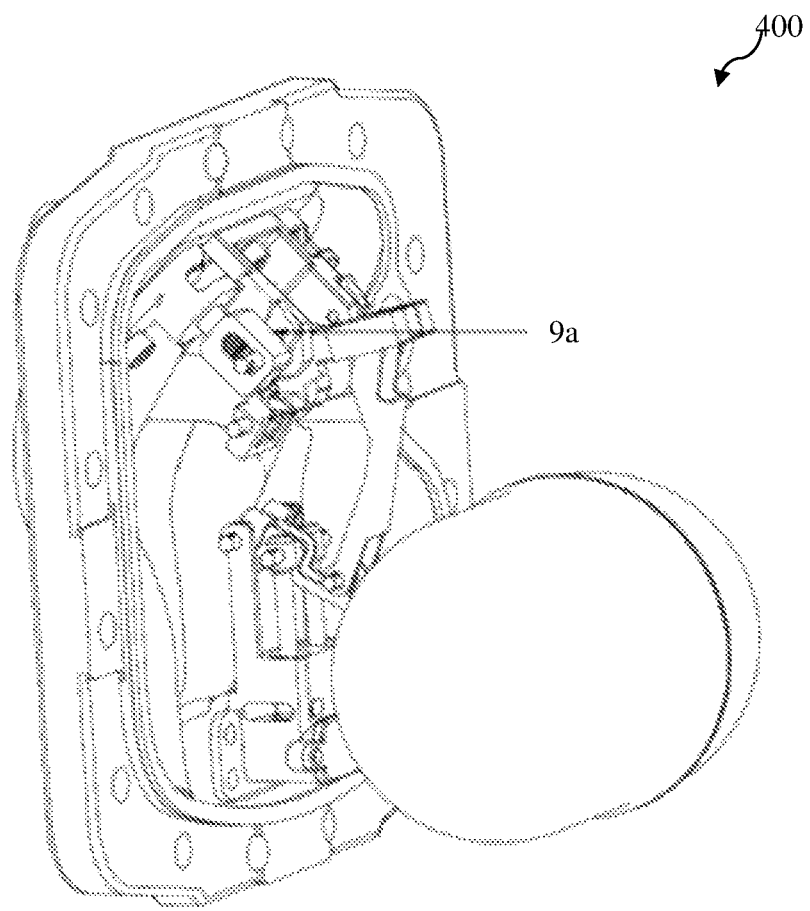

Referring to FIG. 7A and FIG. 7B, the isometric view of the four bar linkage mechanism with various links numbered similar to those in FIG. 3A to 6B, only with subscripts a are shown. For example, the crank 1 is numbered as 1*a*. Additionally the mounting bracket 408 for the mechanism linkages and the mounting base 410 onto which the mounting bracket is bolted is shown. The mounting base houses the motive steam inlet and steam outlet ports (not shown in FIGS. 7A and 7B).

FIG. 8A, FIG. 8B, and FIG. 8C show a detailed views of the steam inlet valve 8*a*, and the actuator link 5*a* at three positions namely position 1, position 2, and position 3. Each of these positions corresponds to the instant when the actuator link 5*a* rotates to close the steam outlet port (not shown) and open the steam inlet port 414. Particularly, each position depicts the relation between the position of the actuator link 5*a* and the steam inlet valve 8*a*. The actuator link 5*a* has a first cam CP1 configured to abut a follower FP1 configured on the steam inlet valve 7 when the actuator link 5 is displaced from the first stopper H to second stopper I. Position 1 refers to the instance when the cam profile "CP1" on the actuator link 5*a* just comes into contact with the follower profile "FP1" along the area indicated by D" with the stem of the steam inlet valve 8*a*. Position 2 refers to an instance where the stem has been lifted adequately to maximize the flow rate through the steam inlet seat not shown. The area of contact indicated by D" previously now shifts to a line of contact as indicated by E". Position 3 refers to the instance when the steam inlet valve 8*a* has been lifted to the maximum and the actuator link 5*a* has reached its upper stopper. The line of contact previously indicated by E" now shifts to point of contact shown as F". In each position, the distances A", B", and C" are the distances between the actuator link 5*a* pin joint and the point of application of the opening force on the steam inlet valve 8*a* at different instances of time. The cam and follower profile can be so designed such that the distances B"<A"<C".

This implies that the distance between the pin joint of the actuator link 5*a* and the point of application of the steam inlet valve 8*a* opening force (on the area D" to the line of contact E") is first reduced up to the distance B", thereby decreasing the moment arm of the opening force as the actuator link 5*a* rotates. This increases the mechanical advantage of the biasing member (not shown) for the required opening force against the motive steam inlet pressure. The lift of the steam inlet valve 8*a* up to the distance B" opens the steam inlet valve 8*a* completely reducing the pressure drop across it, thereby reducing the required opening force to a minimum. Beyond this distance, the required opening force reduces to a minimum, and hence, the required mechanical advantage also reduces. Hence, the cam and follower profile are suited to increase the distance to B" (from the line of contact E" to point contact F"), thereby decreasing the mechanical advantage. A consequence of decreasing the mechanical advantage and increasing the distance from B" to C" is an additional lift of the steam inlet valve 8*a* per unit rotation of the actuator link 5*a*, thereby ensuring that the steam inlet valve 8*a* is completely open. Various cam and follower profiles can be designed such that the required mechanical advantage or lift to open the steam inlet valve 8*a* can be configured to increase or decrease through the cam and follower profile.

F"), thereby decreasing the mechanical advantage. A consequence of decreasing the mechanical advantage and increasing the distance from B" to C" is an additional lift of the steam inlet valve 7*a* per unit rotation of the actuator link 5*a*, thereby ensuring that the steam inlet valve 7*a* is completely open. Various cam and follower profiles can be designed such that the required mechanical advantage or lift to open the steam inlet valve 7*a* can be configured to increase or decrease through the cam and follower profile.

The degree of mechanical advantage depends on the ratio of the distance A" to the length of the actuator link 5*a* between its pivot and the biasing member 6 pivot point (actuator pivoting distance "APD"). Greater the ratio, greater is the mechanical advantage. This ratio for an adequate mechanical advantage should not be less than 3.5, i.e., (actuator pivoting distance "APD"/distance A)≥3.5. Typical increase in the opening force due the mechanical advantage is about 15% compared to a configuration where there is no cam and follower profile.

FIG. 9A shows a side view of the four bar linkage at the upper condensate level L1. In many situations, after continuous operation for long periods of time, the mechanism is subjected to wear accelerated by high temperatures. Exposure to alternating steam and condensate cycles leads to the deposition of dirt and other particulate matter which can build up between pivot joints increasing the static and dynamic coefficients of friction. This combination of wear and friction can cause the upper condensate level L1 to increase and the snap over point to shift upwards and in severe cases, this can even lead to jamming.

FIG. 9B shows a way of overcoming the problem of friction and wear. As the buoyant body 406 moves to the upper snap position, it rotates the crank 1*a*. Correspondingly, the coupler link 2*a* being part of the four bar linkage mechanism both rotates and translates. The coupler link 2*a* so modified to include protrusion P, such that the protrusion P configured to abut the actuator link 5*a* at the snap over point. If the snap over of the mechanism does not take place due to friction and wear, the steam inlet valve 8*a* will remain closed, and the steam exhaust valve 9*a* open allowing the condensate to fill the vessel 402, thereby further increasing the level of condensate within the vessel 402. This causes the buoyant body 406 to move upwards due to buoyancy, thereby rotating the crank 1*a* in the direction as shown. This in turn moves the driving or coupler link 2a which now pushes the actuator link 5a in the direction of rotation forcing it to snap over. The extended surface can also contain a roller to reduce the sliding friction between itself and the actuator link 5a at the point of contact. The profile of the protrusion P of the coupler link 2a and the surface of the actuator link 5a at the points of contact can be so modified similar to a cam and follower to optimize the frictional load in the mechanism so as to minimize the additional buoyant force required to push the actuator link 5a.

The distance G represents the moment arm of a part of the buoyant force that acts against the frictional torque of the pin joints. Greater the distance G, larger is the moment arm and thereby lesser buoyant force will be required to overcome the frictional torque. For all practical purposes, this distance G should be greater than half of the actuator link 5a pivoting length so that the buoyant body 406 is loaded to an acceptable limit due to the frictional torque imposed by the pin joints, i.e., (Actuator pivot length/G<2).

In an embodiment, the driven link 3 has a second cam CP2 configured to abut a second follower FP2 configured on the actuator link 5.

FIG. 10A illustrates the positions that the four bar linkage mechanism will occupy when the condensate outlet valve 12a will close the condensate outlet port 412. This is the lowest position that the buoyant body 406 will occupy. In this situation, the cam (CP2) of the driven link 3a engages with the follower profile (FP2) on the actuator 5a at the line of contact as indicated by J". The biasing member 6a is mounted between the pivots as shown at a distance K.

FIG. 10B shows the mechanism in a position when the condensate has reached the lower level and the buoyant body 406 has moved in the upward direction corresponding to the lower level of condensate within the vessel 402. The cam profile (CP2) on the driven link 3a remains in contact with the follower profile (FP2) on the actuator link 5a though the line of contact J" has shifted towards the actuator link 5a. Although the buoyant body 406, and thereby, the crank 1a rotates from the initial position to the position corresponding to the lower level L1, the distance K between the biasing member pivots remain the same. This is due to the arrangement of the cam and follower profile (CP2 and FP2).

Referring back to FIG. 10A, during the trapping mode, when the condensate outlet port 412 is closed, the differential pressure across the arrangement 400 imparts a sealing force on the condensate outlet valve 12a proportional to the area of the outlet orifices. The moment of these sealing forces and the moment due to the buoyant body weight are overcome by the buoyant force of the buoyant body 406 as it gets immersed with the increasing level of condensate within the vessel 402. These sealing forces are significant and a significant portion of the buoyant body 406 gets immersed for the required buoyant force. Any excessive load will cause the buoyant body 406 to completely get immersed and the buoyant force would be inadequate to open the outlet orifices against the differential pressure.

As the condensate level in the vessel 402 rises, the immersion of the buoyant body 406 increases and when adequate buoyant force is achieved, it moves in the upward direction about the pin joint of the crank 1a lifting the condensate outlet valve 12a from the condensate outlet port 412. A minimum opening or lift is required to ensure that the condensate outlet port 412 has completely opened and the corresponding pressure drop across the condensate outlet valve 12a has reached its minimum value. At the same time the driven link 3a rotates about its pivot causing the actuator link 5a to rotate towards its lower stopper due to the contact of the cam profile (CP2) on the driven link 3a with the follower profile (FP2) on the actuator link 5a and the biasing member 6, which pulls the driven link 3a and the actuator link 5a towards each other. As the buoyant body 406 opens the outlet orifices to the minimum required lift, it becomes imperative that the distance K between the biasing member pivots does not increase. This is because an increase in the distance K would impart an additional force corresponding to the difference in the biasing member distance K onto the crank 1a through the links 3a and 2a. This additional force would warrant an increase in the buoyant force and thereby the immersion of the buoyant body 406 would increase.

However, by providing the cam (CP2) and follower (FP2) profile on the driven link 3a and the actuator 5a, respectively, the distance K of the biasing member can be maintained constantly as the buoyant body 406 moves from its lowest position to the position corresponding to the lower level. Hence, any additional force on the buoyant body 406 is avoided thereby reducing the size of the buoyant body 406 required for a given set of conditions. As the buoyant body 406 moves from the lower position to the position corresponding to the lower level, the line of contact slides towards the actuator link 5a as shown in FIGS. 10a and 10b.

Beyond the lower level of condensate in the vessel 402, the cam profile (CP2) of the driven link 3a disengages with the follower profile (FP2) of the actuator link 5a and stretches the biasing member beyond the distance K. This is because beyond the lower level, the force exerted by the outlet orifices on the buoyant body 406 has reduced to a minimum and a large percentage of immersion is now available to overcome the force exerted by the biasing member. In this manner, the size of the buoyant body 406 is reduced by using the cam and follower profile to nullify the effect of the biasing member load during trapping conditions.

The buoyant body 406 has an aspect ratio not less than 1 and not greater than 2. The buoyant body 406 has a shape selected from cylindrical, oblate shaped, a combination of a cylindrical body with spherical ends, or similar shapes. This is done to optimize the overall size of the arrangement 400.

In an embodiment, the arrangement 400 is configured to operate in the first configuration and the second configuration. In the first configuration, the actuator link 5 is configured to open the steam outlet port 416 and close the steam inlet port 414 to allow steam outflow from the vessel 402. Further, in the first configuration, the condensate outlet port 412 is open for discharging condensate from the vessel 402.

In the second configuration, the actuator link 5 is configured to open the steam inlet port 414 and close the steam outlet port 416 to allow steam inflow in the vessel 402, thereby increasing pressure within the vessel 402. Further, in the second configuration, the condensate outlet port 412 is open for discharging condensate from the vessel 402.

The operative configuration of the arrangement 400 is now described when it operates under pure trapping condition, i.e. the first operative configuration. In the pure trapping condition, the actual differential pressure is greater than the required differential pressure, and the pressure P2 is greater than the back pressure P3. As the condensate fills up to the level L2 within the vessel 402, the link mechanism is biased to keep the steam outlet port 416 open and the motive steam inlet port 414 closed. As a result, the pressure within the vessel 402 becomes equal to the process pressure P2. Hence, the condensate from the heat exchanger 208 flows by the virtue of gravity, or equivalently, the condensate filling head $H_f$ through the inlet check valve 212 (which requires a very small condensate head to open, typically 5 to 10 millibar for swing check valves) and fills the vessel 402 up to level L1, at which the trapping mechanism opens the condensate outlet port 412. The pressure P2 is adequate to push the condensate out of the condensate outlet port 412 while opening the outlet check valve 222 against the back pressure P3. As the required flow rate of condensate is less than the actual flow rate of condensate across the condensate outlet port 412, the level of condensate within the vessel 402 always remain between the level L1 and L2 and will never increase beyond the level L2.

The operative configuration of the arrangement 400 is now described when it operates under pure stalling condition, i.e. the second operative configuration. In the pure stalling condition, the differential pressure is either zero or less than zero, meaning the pressure P2 is equal to or less than the back pressure P3. Therefore, the condensate outflow through the condensate outlet port 412 becomes zero. For pressure P2 less than back pressure P3 (negative differential pressure), the outlet check valve 222 closes to prevent back flow of condensate into the heat exchanger 208. In this condition, the arrangement 400 operates as a pressure powered pump. The arrangement 400 operates on a cycle which consists of condensate filling, steam pressurization, condensate pumping, and steam exhaust. The buoyant body 406 senses the level of the condensate within the vessel 402. The four bar linkage that is operatively connected to the buoyant body 406 is biased such that as the level of the condensate increases up to the level L2, the steam outlet port 416 will remain open while the motive steam inlet port 414 remains closed. The pressure P2 and the pressure within the vessel 402 equalize because of which the condensate fills the vessel 402 by the virtue of gravity, or equivalently, the condensate head alone. The level rise from L1 to L2 is due to the fact that there is no condensate outflow from the vessel 402 even though the condensate outlet port 412 is open. The condensate filling cycle begins as the condensate fills the vessel 402. When the condensate level increases just beyond L2, the motive steam inlet port 414 is opened and the steam outlet port 416 is closed. This signifies the point at which condensate filling ends and steam pressurization begins. Steam flows through the motive steam inlet header 213 into the vessel 402, thereby increasing the pressure within the vessel 402. As the pressure within the vessel 402 increases, the inlet check valve 212 instantaneously closes. As the pressure within the vessel 402 increases up to the back pressure P3, steam pressurization is complete. When the pressure within the vessel 402 increases beyond the back pressure P3, the condensate pumping begins where the condensate gets pushed out, by the virtue of the inlet motive steam pressure P1, through the condensate outlet port 412 and outlet check valve 222 (opens if closed as the vessel pressure becomes greater than the back pressure P3) against the back pressure P3 back to the feed water tank 218 through the condensate discharge pipe 220. As the condensate gets pumped and the level within the vessel 402 reduces from L2 to L1, the motive steam inlet port 414 is kept open while the steam outlet port 416 is kept closed. When the condensate level within the vessel 402 falls just below the level L1, the motive steam inlet port 414 is closed and the steam outlet port 416 is opened, thereby signaling the end of condensate pumping and the beginning of steam exhaust. The pressure in the vessel 402 at this instant will be significantly higher than the pressure P2 and the steam within the vessel 402 will escape through the steam outlet pipe 216 in to the first condensate header 211. The pressure within the vessel 402 will drop, and when the pressure becomes equal to the process pressure P2, the inlet check valve 212 will open indicating the end of steam exhaust. In the case where the process pressure P2 is less than the back pressure P3, the outlet check valve 222 closes when the pressure within the vessel 402 drops marginally below the back pressure P3. The whole cycle repeats itself, and for a given cycle, condensate between the levels L1 and L2 in the vessel 402 is pumped back into the feed water tank 218.

As such, the arrangement 400 acts completely like a steam operated pressure powered pump, and thus allows the complete recovery of condensate even in pure stalling conditions.

The operative configuration of the arrangement 400 is now described when it operates under stalling condition. From the beginning of stalling to pure stalling, the arrangement 400 behaves both like a steam trap and a pressure powered pump. In such conditions, the outlet check valve 222 will necessarily be open and the outflow of condensate from the vessel 402 due to differential pressure will be inadequate, thereby increasing the level within the vessel 402 beyond the level L2. This causes the arrangement 400 to go into steam pressurization, condensate pumping, and steam exhaust. In other words, the outflow of condensate will take place during the filling cycle due to differential pressure (DP=P2−P3) and the condensate pumping cycle due to steam motive inlet pressure P1. The fraction of the total mass of condensate pumped out is known as the percentage of stalling. The remainder of condensate is pushed out in trapping.

In typical applications, the processes themselves warrant the mounting of the heat exchanger 208 close to the ground. As a result, the filling head $H_f$ itself is typically around 100 mm. The arrangement 400 has to be so configured that the upper level L2 should be lower than the bottom most point of the heat exchanger 208. If not, then the condensate will back up during condensate filling cycle itself into the heat exchanger 208, thereby reducing the effective heat transfer area and dropping the process fluid outlet temperature $T_{f2}$. In another embodiment, the arrangement 400 is mounted below the ground level to further lower the level L2 or preferably to configure the arrangement 400 with a lower upper level to avoid the necessity of digging pits for mounting and installation. The distance from the mounting position of the arrangement 400 to the upper level L2 is known as the filling height $H_h$ and should be made as small as possible. Another factor that dictates the ease of installation is the height of the arrangement 400 itself and should be made as small as possible. This is because the heat exchanger 208 is mounted close to the ground providing limited space for installation and maintenance beneath.

TECHNICAL ADVANCEMENTS

The present disclosure described herein above has several technical advantages including, but not limited to, the realization of an arrangement for removing condensate from a heat exchanger that:
   efficiently removes condensate from the heat exchanger;
   facilitates the removal of condensate from the heat exchanger even when the pressure inside the heat exchanger drops below that of the downstream pressure; and
   is compact.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An arrangement (400) for removing condensate from a heat exchanger (208), said arrangement (400) comprising:
   a vessel (402) having a condensate inlet port (404) in fluid communication with an outlet of said heat exchanger (208) to receive condensate, a condensate outlet port (412) in fluid communication with said condensate discharge pipe (220), a steam inlet port (414) in fluid communication with a steam source, and a steam outlet port (416);
   a buoyant body (406) disposed within said vessel (402);
   a four bar linkage defined by a fixed link (4), a crank (1) connected to said fixed link (4) and said buoyant body (406), a driven link (3) connected to said fixed link (4), and a coupler link (2) connected to said crank (1) and said driven link (3); and
   an actuator link (5) pivotally connected to a pivot (E) and connected to a junction of said driven link (3) and said coupler link (2) via a biasing member (6), said actuator link (5) configured to be displaced between a first stopper (H) and a second stopper (I) under influence of said biasing member (6);
   a first slider link (11) coupled to said crank (1) and configured to be linearly displaced under influence of said crank (1); and
   a condensate outlet valve (12) connected to said first slider link (11) and configured to open or close said condensate outlet port (412) through a seat (18);
wherein:
the ratio of angular displacement of said crank (1) to the angular displacement of said driven link (3) is more than 1 in said four bar linkage; and
the aspect ratio of said buoyant body (406) is less than 2.

2. The arrangement (400) as claimed in claim 1, which comprises:
   a steam inlet valve (7) configured to be linearly displaced under influence of said actuator link (5), said steam inlet valve (7) configured to open or close said steam inlet port (414), wherein said steam inlet valve (7) rests against an operative outer surface of said steam inlet port (414); and
   a steam exhaust valve (9) connected to said actuator link (5) in a plane parallel to said steam inlet valve (7), and configured to be linearly displaced under influence of said actuator link (5), said steam exhaust valve (9) configured to open or close said steam outlet port (416), wherein said steam exhaust valve (9) rests against an operative inner surface of said steam outlet port (416);
   wherein, said actuator link (5) has a first cam (CP1) configured to abut a follower (FP1) configured on said steam inlet valve (7) when said actuator link (5) is displaced from said first stopper (H) to said second stopper (I).

3. The arrangement (400) as claimed in claim 2, wherein said driven link (3) has a second cam configured to abut a second follower configured on said actuator link (5).

4. The arrangement (400) as claimed in claim 1, wherein said coupler link (2) has a protrusion (P) configured to abut said actuator link (5).

5. The arrangement (400) as claimed in claim 1, wherein said biasing member (6) is a spring.

6. The arrangement (400) as claimed in claim 1, wherein said steam source is a boiler.

7. The arrangement (400) as claimed in claim 1, wherein said ratio of angular displacement of said crank (1) to the angular displacement of said driven link (3) is more than 1.5 in said four bar linkage.

* * * * *